United States Patent
Chen

(10) Patent No.: US 9,357,344 B2
(45) Date of Patent: May 31, 2016

(54) TIME CALIBRATION METHOD AND DEVICE

(75) Inventor: Pucha Chen, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/370,620

(22) PCT Filed: Mar. 15, 2012

(86) PCT No.: PCT/CN2012/072348
§ 371 (c)(1),
(2), (4) Date: Jul. 3, 2014

(87) PCT Pub. No.: WO2013/102324
PCT Pub. Date: Jul. 11, 2013

(65) Prior Publication Data
US 2015/0005003 A1    Jan. 1, 2015

(30) Foreign Application Priority Data
Jan. 6, 2012  (CN) .......................... 2012 1 0002950

(51) Int. Cl.
| H04W 4/02 | (2009.01) |
| H04W 4/00 | (2009.01) |
| G01S 19/00 | (2010.01) |
| G04R 20/02 | (2013.01) |

(52) U.S. Cl.
CPC .................. *H04W 4/02* (2013.01); *G01S 19/00* (2013.01); *G04R 20/02* (2013.01); *H04W 4/001* (2013.01); *H04W 4/025* (2013.01)

(58) Field of Classification Search
CPC ....... H04W 4/001; H04W 4/025; H04W 4/02; G04R 20/02; G01S 19/00
See application file for complete search history.

(56) References Cited

U.S. PATENT DOCUMENTS

| 6,346,911 B1 * | 2/2002 | King .......................... 342/357.62 |
| 2005/0232086 A1 * | 10/2005 | Jiddou et al. .................... 368/47 |
| 2010/0019968 A1 | 1/2010 | Shingyoji |

(Continued)

FOREIGN PATENT DOCUMENTS

| CN | 100426881 C | 10/2008 |
| CN | 101340665 A | 1/2009 |
| CN | 101959154 A | 1/2011 |

(Continued)

OTHER PUBLICATIONS

International Search Report (Form PCT/ISA/210) for PCT/CN2012/072348, mailed Aug. 16, 2012.

(Continued)

*Primary Examiner* — Christopher M Brandt
(74) *Attorney, Agent, or Firm* — Koppel, Patrick, Heybl & Philpott

(57) ABSTRACT

Disclosed are a time calibration method and device. The method includes: a mobile terminal determines the local time where the mobile terminal is located according to the time data in a received GPS navigation message and time zone information about the mobile terminal (S102); and the mobile terminal performing time calibration on itself according to the local time where it is located (S104). The embodiments of the present disclosure can solve the problem that a mobile terminal cannot precisely adjust the time automatically if there is no accurate reference time or if there is no network coverage.

9 Claims, 3 Drawing Sheets

(56) References Cited

U.S. PATENT DOCUMENTS

2011/0280108 A1 11/2011 Honda
2012/0170425 A1* 7/2012 Matsuzaki ..................... 368/47

FOREIGN PATENT DOCUMENTS

CN 102156403 A 8/2011
CN 101430372 B 12/2011

OTHER PUBLICATIONS

Peter H. Dana, et al., "The Role of GPS in Precise Time and Frequency Dissemination", reprinted from GPS World Jul./Aug. 1990.
Supplementary European Search Report from European Patent Appl. No. 12864557.9, dated Jul. 28, 2015.

* cited by examiner

TIME CALIBRATION METHOD AND DEVICE

TECHNICAL FIELD

The present disclosure relates to the field of communications, and in particular to a time calibration method and device.

BACKGROUND

Mobile terminals are widely applied due to its portability and good performance. However, due to the portability of mobile terminals, the time thereof may often go wrong and need to be time calibrated with a fixed terminal or other systems.

Currently, common mobile terminal time calibration methods include the following categories:

1. manual adjustment based on known reference time (media such as TV, broadcast, etc.);
2. automatic adjustment by means of network time synchronization; and
3. acquiring time from a specific time server by means of short messages and so on and then performing manual or automatic time adjustment.

However, the above three methods have some defects to different extents, which causes a user to be unable to handle the time calibration of mobile terminals. These defects are respectively:

1. manual adjustment based on known reference time, the mobile terminal must have known accurate reference time and manual adjustment inevitably introduces errors;
2. automatic adjustment by means of network time synchronization, the mobile terminal must be located within the coverage of a wireless network; and meanwhile, for a UMTS (Universal Mobile Telecommunications System) network, the time accuracy is not enough, which can only reach second level; and
3. time calibration by means of short messages and so on, the mobile terminal must be located in the coverage of a network, and it also needs to deploy certain time servers; and meanwhile, accessing these time servers also increases the usage cost of the user.

Therefore, there is no method in the relevant art which can enable a mobile terminal to precisely adjust the time automatically if there is no accurate reference time or if there is no network coverage.

With regard to the problem in the relevant art that a mobile terminal cannot precisely adjust the time automatically if there is no accurate reference time or if there is no network coverage, no effective solution is proposed currently.

SUMMARY

With regard to the problem in the relevant art that a mobile terminal cannot precisely adjust the time automatically if there is no accurate reference time or if there is no network coverage, the present disclosure provides a time calibration method and device so as to solve the problem.

According to one aspect of the present disclosure, a time calibration method is provided, comprising: a mobile terminal determining local time where the mobile terminal is located according to time data in a received global positioning system (GPS) navigation message and time zone information about the mobile terminal; and the mobile terminal performing time calibration on itself according to the local time where it is located.

Preferably, the mobile terminal determining the local time where the mobile terminal is located according to the time data in the received GPS navigation message and time zone information about the mobile terminal comprises: the mobile terminal parsing the time data and obtaining local universal time coordinated (UTC) time of the mobile terminal; and the mobile terminal determining the local time where the mobile terminal is located according to the local UTC time and the time zone information about the mobile terminal.

Preferably, the mobile terminal parsing the time data and obtaining the local UTC time of the mobile terminal comprises: the mobile terminal parsing the time data and obtaining a header of word (HOW) of each subframe; the mobile terminal reading a time of week (TOW) in the HOW, wherein the TOW records the UTC microsecond number of the sending time of the subframe; and the mobile terminal calculating a UTC timestamp of the sending time of each subframe by combining the UTC microsecond number and the week number contained in a first subframe which is in a frame where the subframe is located.

Preferably, the mobile terminal performing the time calibration on itself comprises: the mobile terminal employing an active mode or a passive mode to perform the time calibration on itself, wherein the active mode refers to time calibration activated by a user of the mobile terminal (ME), and the passive mode refers to time calibration activated by a GPS satellite after the positioning of the GPS satellite succeeds and it is detected that the time of the user has an error.

Preferably, the mobile terminal reading the TOW in the HOW when the mobile terminal employs the active mode to perform the time calibration comprises: if a navigation message of at least one GPS satellite is parsed out, then reading a TOW with the shortest transmission time in the HOW.

Preferably, the time zone information is stored in a world time module of the mobile terminal.

According to another aspect of the present disclosure, a time calibration device provided in a mobile terminal is provided, comprising: a determination module configured to determine local time where the mobile terminal is located according to time data in a received global positioning system (GPS) navigation message and time zone information about the mobile terminal; and a calibration module configured to perform time calibration on the mobile terminal according to the local time where the mobile terminal is located.

Preferably, the determination module comprises: a parsing unit configured to parse the time data and obtaining local Universal Time Coordinated (UTC) time of the mobile terminal; and a determination unit configured to determine the local time where the mobile terminal is located according to the local UTC time and the time zone information about the mobile terminal.

Preferably, the parsing unit comprises: a parsing subunit configured to parse the time data and obtain a header of word (HOW) of each subframe; a reading subunit configured to read a time of week (TOW) in the HOW, wherein the TOW records the UTC microsecond number of sending time of the subframe; and a calculation subunit configured to calculate a UTC timestamp of the sending time of each subframe by combining the UTC microsecond number and the week number contained in a first subframe which is in a frame where the subframe is located.

Preferably, the reading subunit is further configured to read a TOW with the shortest transmission time in the HOW when the parsing subunit parses out a navigation message of at least one GPS satellite.

In the embodiments of the present disclosure, a mobile terminal determines the local time where the mobile terminal is located according to the time data in a GPS navigation message and the time zone information about the mobile terminal, and thus can perform time calibration on itself according to the local time where it is located. It can be seen that by means of the method provided in the embodiments of the present disclosure, if there is a GPS, a mobile terminal can perform time calibration without determined reference time or there being network coverage, thus being able to realize automatic time adjustment of the mobile terminal in the case of extreme environment. As compared to the existing time calibration method, the time calibration method provided in the embodiments of the present disclosure eliminates the errors which may be introduced by manual modification, overcomes the reliance on wireless network coverage, and can realize all-weather, global, full automatic, and high precise time calibration.

BRIEF DESCRIPTION OF THE DRAWINGS

Drawings, provided for further understanding of the present disclosure and forming a part of the specification, are used to explain the present disclosure together with embodiments of the present disclosure rather than to limit the present disclosure. In the drawings.

DETAILED DESCRIPTION OF THE EMBODIMENTS

The present disclosure is described below with reference to the accompanying drawings and embodiments in detail. Note that, the embodiments of the present disclosure and the features of the embodiments can be combined with each other if there is no conflict.

It is mentioned in the relevant art that a mobile terminal cannot precisely adjust the time automatically if there is no accurate reference time or if there is no network coverage. In order to solve the above technical problem, an automatic mobile terminal time calibration method and device based on GPS (Global Positioning System) is proposed in the embodiments of the present disclosure, which can better meet the need of this aspect. As long as a mobile terminal has a GPS function, it can employ the method and device provided in the embodiments of the present disclosure to realize automatic time calibration in these extreme environments and can reach time precision of microsecond level. The principles of performing time calibration using a GPS satellite are as follows: each GPS satellite is mounted with a high-precision cesium atom clock and each GPS satellite synchronizes with universal time coordinated (UTC), so that the GPS satellite can be used as a reliable time reference.

Figure 1:
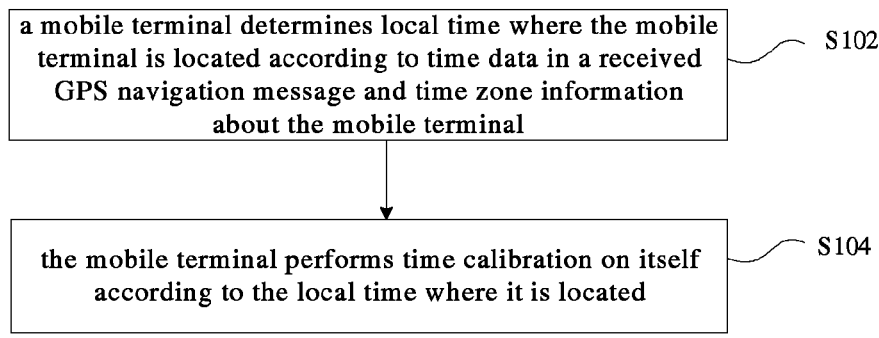
FIG. 1 is a schematic flowchart of a time calibration method according to an embodiment of the present disclosure.

According to the above analysis, a time calibration method is provide in an embodiment of the present disclosure, the schematic flowchart of which is as shown in FIG. 1, including steps S102 to step S104:

step S102, a mobile terminal determines local time where the mobile terminal is located according to time data in a received GPS navigation message and time zone information about the mobile terminal; and step S104, the mobile terminal performs time calibration on itself according to the local time where it is located.

In the embodiment of the present disclosure, the mobile terminal determines the local time where the mobile terminal is located according to the time data in the GPS navigation message and the time zone information about the mobile terminal, and thus can perform time calibration on itself according to the local time where it is located. It can be seen that by means of the method provided in the embodiment of the present disclosure, if there is a GPS, the mobile terminal can perform time calibration without determined reference time or there being network coverage, thus being able to realize automatic time adjustment of the mobile terminal in the case of extreme environment. As compared to the existing time calibration method, the time calibration method provided in the embodiment of the present disclosure eliminates the errors which may be introduced by manual modification, overcomes the reliance on wireless network coverage, and can realize all-weather, global, full automatic, and high precise time calibration.

In the flow shown in FIG. 1, the time zone information can be stored in a world time module of the mobile terminal, and currently, there is a world time module in each mobile terminal, the mobile terminal can detect which time zone it is in currently according to the world time module and acquire precise time zone information.

In the flow shown in FIG. 1, it is mentioned in step S102 that the mobile terminal can determine the local time where the mobile terminal is located according to the time data in a received GPS navigation message and time zone information about the mobile terminal. In a preferred embodiment, step S102 can determine the local time according to the following steps: the mobile terminal parses the time data and acquires the local universal time coordinated (UTC) time of the mobile terminal; and after having determined the local UTC time, the mobile terminal then determines the local time where the mobile terminal is located according to the local UTC time and the time zone information of the mobile terminal.

The particular acquisition method of the local UTC time mentioned in this preferred embodiment may be as follows:

step I, the mobile terminal parses the time data and obtains a header of word (HOW) of each subframe;

step II, the mobile terminal reads a time of week (TOW) in the HOW, wherein the TOW records the UTC microsecond number of the sending time of the subframe; and step III, the mobile terminal calculates a UTC timestamp of the sending time of each subframe by combining the UTC microsecond number and the week number contained in a first subframe which is in a frame where the subframe is located.

Since the sending time of each subframe recorded by the TOW is precise to microsecond level, during the following processing, the UTC timestamp of the sending time of each subframe is also precise to microsecond level, thus ensuring that time calibration performed using GPS can reach time precision of microsecond level. In addition, since GPS location calculation employs the method of spatial distance resection, the microsecond-level error of the mobile terminal and the UTC time can be calculated precisely. As such, on the basis that GPS positioning is successful, the embodiment of the present disclosure can calculate a time value precise to microsecond level, so as to perform time calibration in an active or passive mode.

During particular time calibration process, the GPS satellite continuously broadcasts the navigation message to the globe at a frequency of 30 seconds per frame, and each frame is equally divided into five subframes, the header of word (HOW) of each subframe contains 17-bit time of week (TOW). TOW records the UTC microsecond number of the sending moment of the subframe, and in combination with the week number contained in a first subframe, a UTC timestamp of the sending moment of the subframe may be calculated. The mobile terminal may calculate the current time in combination with the time zone information stored therein. Since the GPS satellite is distributed in the sky of more than 20 thousand km and the light speed is up to 299792.458 km per second, in the case of taking transmission time delay into account, a time value precise to second level can be calculated by parsing the navigation message so as to perform time calibration in an active mode.

With regard to time calibration in the active mode mentioned in the above, during implementation, except the active mode, the mobile terminal can also employ a passive mode to perform time calibration on itself, wherein the referred active mode refers to time calibration activated by a user of the mobile equipment (ME), and the referred passive mode refers to time calibration activated by a GPS satellite after the GPS satellite positioning is successful and it is detected that the time of the user has errors.

When the mobile terminal employs the active mode to perform the time alignment, the mobile terminal may parse out the navigation message from at least one GPS satellite, and at this moment, there is also at least one corresponding TOW, then the TOW with the shortest transmission time in the HOW may be read so as to ensure the precision of time calibration.

In summary, the technical problem to be solved by the embodiments of the present disclosure is: how a mobile terminal precisely adjusts the time automatically if there is no accurate reference time or if there is no network coverage. In order to solve the above technical problem, in the embodiments of the present disclosure, by way of parsing the time data in the GPS navigation message, the local UTC time of the mobile terminal is calculated, and then in combination with the time zone information stored in the world time module of the mobile terminal, the local time where the mobile terminal is located is calculated, and finally, the user time adjustment for the mobile terminal is finished automatically.

In order to illustrate the time calibration method provided in the embodiments of the present disclosure more clear and understandable, it will be described with particular embodiments.

Embodiment 1

The flow shown in FIG. 1 in the embodiment of the present disclosure is the core concept, and the particular steps thereof are illustrated particularly, the processing procedure of which is as follows:

the first step, a user of a mobile terminal (ME) initiates time calibration (active mode) or GPS positioning (passive mode).

The second step, the mobile terminal (ME) responds to the request and starts to search for a satellite to perform GPS positioning.

The third step, if the ME has found enough satellites within the designated time and calculates the precise time offset between the local UTC time of the ME and the standard UTC time. Then, in combination with the local UTC time of the time module in the ME, the adjusted local UTC time is calculated, and then jump to the sixth step. Otherwise, for the active mode, continue to perform the fourth step; and for the passive mode, handle same according to the common GPS processing procedure, i.e., end the positioning procedure.

The fourth step, if the navigation message from at least one satellite is parsed out, the TOW of the signal with the shortest transmission time is used for calculating the local UTC timestamp. Otherwise, the calibration procedure ends.

The fifth step, according to the local UTC timestamp and in combination with the standard UTC start time, the local UTC time of the ME is calculated.

The sixth step, in combination with the current time zone information saved in the world time module, the local time is calculated. Then, the local time is taken as the new user time, and the user time of the ME is adjusted to achieve the purpose of automatically calibrating the time of the mobile terminal.

As compared to the existing time calibration method, the processing steps of the time calibration method provided in the embodiments of the present disclosure eliminate the errors which may be introduced by manual modification, overcome the reliance on wireless network coverage, and can realize all-weather, global, full-automatic, and highly precise time calibration.

Embodiment 2

Figure 2:
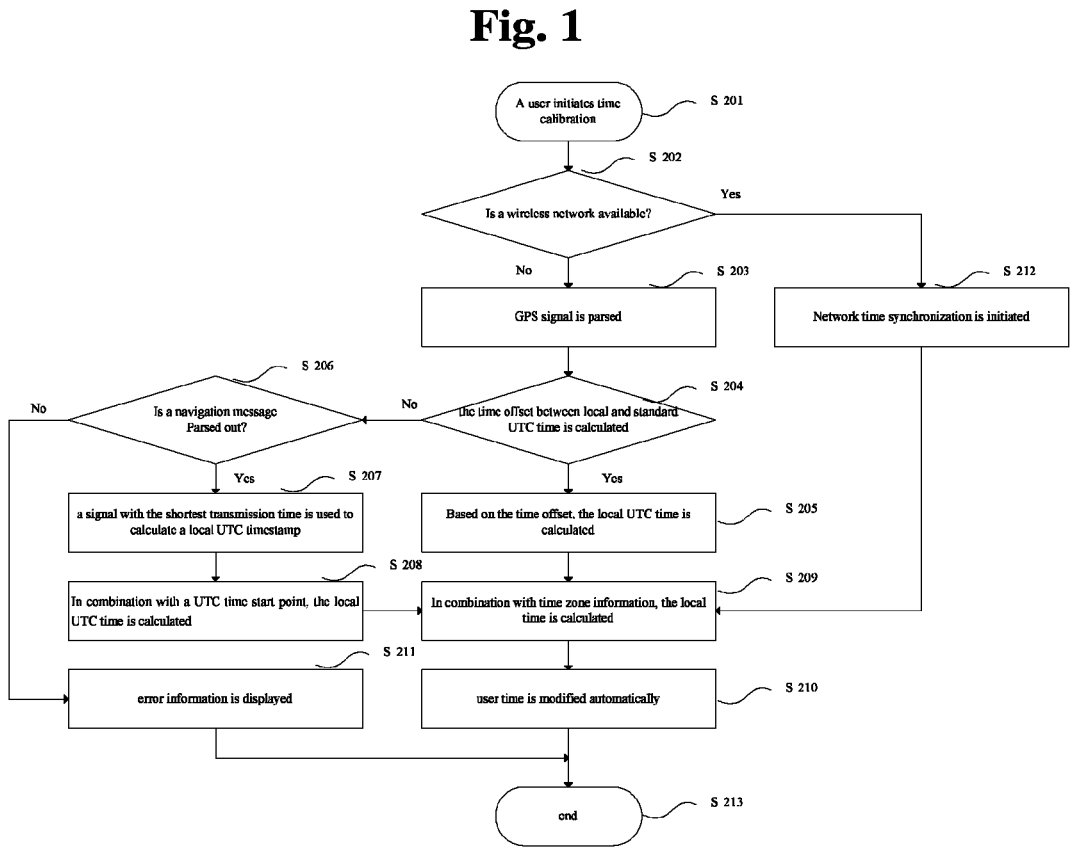
FIG. 2 is a schematic flowchart of performing time calibration on a mobile terminal in an active mode according to embodiment II of the present disclosure.

This embodiment further refines the time calibration method provided in embodiment 1, and this embodiment provides how a mobile terminal performs time calibration in an active mode, the particular flow of which is as shown in FIG. 2, including step S201 to step S213.

Step S201, a user of a mobile terminal (ME) initiates time calibration.

Step S202, the ME judges whether there is an available wireless network, if not, then the step S203 is performed and the time calibration is performed via a GPS; otherwise, the standard UTC time from the network side is obtained and the step S212 is performed.

Step S203, the GPS signal is parsed, i.e. a GPS positioning session in an independent mode is initiated.

Step S204, if the ME succeeds in positioning within a set parsing time interval and detects whether the time offset between the local UTC standard of the ME and standard UTC may be calculated, if yes, then the step S205 is performed; otherwise, the step S206 is performed.

Step S205, the local UTC time from the time module of the ME is obtained, and in combination with the time offset, the adjusted local UTC time is calculated and obtained, and then the step S209 is performed.

Step S206, if the ME has parsed out the navigation message from at least one GPS satellite, the step S207 is performed; otherwise, it is prompted that the calibration of user time has failed, and the step S211 is performed.

Step S207, a signal with the shortest transmission time is selected to calculate a local UTC timestamp, i.e. the sending time of the subframe for the GPS navigation message is taken as standard UTC time for processing. Here, although there are certain errors, these errors are of microsecond level, and therefore, time precision of second level can be achieved, which can totally meet the demand of user time.

Step S208, in combination with the start point of UTC time, i.e., at zero hour on 6 Jan. 1980, plus the local UTC timestamp, calculate the local UTC time.

Step S209, in combination with the time zone information saved in the world time module, use the local UTC time to calculate the local time, for example, Beijing time can be calculated.

Step S210, the user time of the mobile terminal, i.e. time which can be seen by the user, is automatically modified.

Step S211, the error information is displayed on the mobile terminal.

Step S212, the network time synchronization is initiated.

Step S213, time calibration ends.

Embodiment 3

Figure 3:
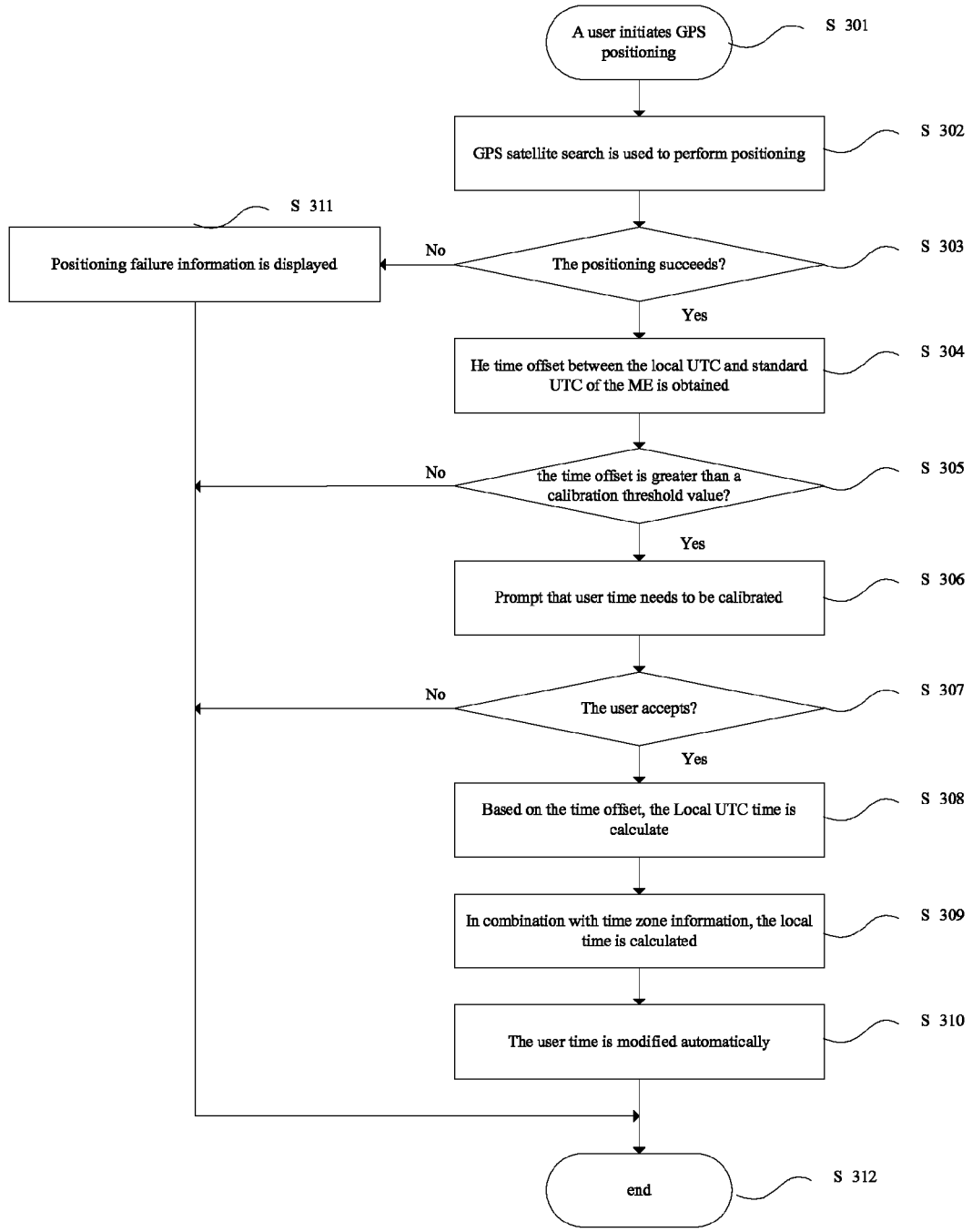
FIG. 3 is a schematic flowchart of performing time calibration on a mobile terminal in a passive mode according to embodiment III of the present disclosure.

This embodiment further refines the time calibration method provided in embodiment 1, and this embodiment provides how a mobile terminal performs time calibration in a passive mode, the particular flow of which is as shown in FIG. 3, including step S301 to step S311.

Step S301, a user of a mobile terminal (ME) initiates GPS positioning.

Step S302, a GPS engine is run to search a GPS satellite and perform location calculation.

Step S303, if positioning succeeds within a designated time, perform step S304; otherwise, prompt that positioning has failed, i.e. what is executed is a common positioning flow, and perform step S311.

Step S304, from the positioning result data, the time offset between the local UTC of the ME and standard UTC is obtained.

Step S305, if the time offset is not zero and exceeds a prescribed calibration threshold, perform step S306; otherwise, perform step S311.

Step S306, it is determined whether it is required to perform time calibration on the user time.

Step S307, if the user accepts, perform step S308; otherwise, perform step S311.

Step S308, the local UTC time is obtained from the time module in the ME, and in combination with the time offset, the adjusted local UTC time is obtained by the calculation.

Step S309, in combination with the time zone information saved in the world time module, the local time is calculated using the local UTC time. For example, Beijing time may be obtained by the calculation.

Step S310, the user time of the mobile terminal, i.e. time which can be seen by the user, is modified automatically.

Step S311, a positioning failure message is displayed on the mobile terminal.

Step S312, end.

Figure 4:
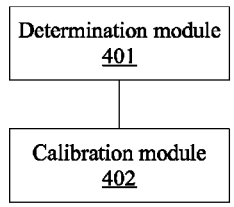
FIG. 4 is a structural schematic diagram of a time calibration device according to an embodiment of the present disclosure.

Based on the same disclosure concept, the embodiment of the present disclosure also provide a time calibration device provided in a mobile terminal for achieving any one preferred embodiment mentioned above, and the structural schematic diagram of the device is as shown in FIG. 4 and comprises:

a determination module 401 configured to determine the local time where the mobile terminal is located according to time data in a received GPS navigation message and time zone information about the mobile terminal; and a calibration module 402 coupled to the determination module 401 and configured to perform time calibration on the mobile terminal according to the local time where the mobile terminal is located.

Figure 5:
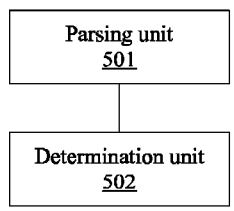
FIG. 5 is a structural schematic diagram of a determination module according to an embodiment of the present disclosure.
Figure 6:
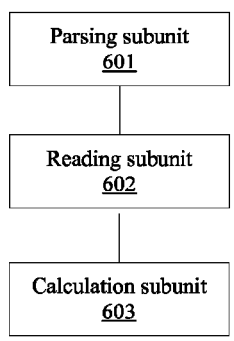
FIG. 6 is a structural schematic diagram of a parsing unit according to an embodiment of the present disclosure.

In a preferred embodiment, as shown in FIG. 5, the determination module 401 may comprise:

a parsing unit 501 configured to parse the time data and obtain local universal time coordinated (UTC) time of the mobile terminal; and a determination unit 502 coupled to the parsing unit 501 and configured to determine the local time where the mobile terminal is located according to the local UTC time and the time zone information about the mobile terminal In a preferred embodiment, as shown in FIG. 6, the parsing unit 501 may comprise:

a parsing subunit 601 configured to parse the time data and obtain a header of word (HOW) of each subframe;

a reading subunit 602 coupled to the parsing subunit 601 and configured to read a time of week (TOW) in the HOW, wherein the TOW records the UTC microsecond number of the sending time of the subframe; and a calculation subunit 603 coupled to the reading subunit 602 and configured to calculate a UTC timestamp of the sending time of each subframe by combining the UTC microsecond number and the week number contained in a first subframe which is in the frame where the subframe is located.

In a preferred embodiment, the reading subunit 602 may be further configured to read a TOW with the shortest transmission time in the HOW when the parsing subunit 601 parses out a navigation message from at least one GPS satellite.

From the description above, it can be seen that the present disclosure achieves the following technique effects:

In the embodiments of the present disclosure, the mobile terminal determines the local time where the mobile terminal is located according to the time data in a GPS navigation message and the time zone information about the mobile terminal, and thus can perform time calibration on itself according to the local time where it is located. It can be seen that by means of the method provided in the embodiments of the present disclosure, if there is a GPS, a mobile terminal can perform time calibration without determined reference time or there being network coverage, thus being able to realize automatic time adjustment of the mobile time in the case of extreme environment. As compared to the existing time calibration method, the time calibration method provided in the embodiments of the present disclosure eliminates the errors which may be introduced by manual modification, overcomes the reliance on wireless network coverage, and can realize all-weather, global, full automatic, and high precise time calibration.

Obviously, those skilled in the art should know that each of the mentioned modules or steps of the present disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the present disclosure is not restricted to any particular hardware and software combination.

The descriptions above are only the preferable embodiment of the present disclosure, which are not used to restrict the present disclosure, for those skilled in the art, the present disclosure may have various changes and variations. Any amendments, equivalent substitutions, improvements, etc. within the principle of the present disclosure are all included in the scope of the protection of the present disclosure.

What is claimed is:

1. A time calibration method, comprising:
    a mobile terminal determining local time where the mobile terminal is located according to time data in a received Global Positioning System (GPS) navigation message and time zone information about the mobile terminal; and
    the mobile terminal performing time calibration on itself according to the local time where it is located;

wherein the mobile terminal determining the local time where the mobile terminal is located according to the time data in the received GPS navigation message and time zone information about the mobile terminal comprises: the mobile terminal parsing the time data and obtaining local Universal Time Coordinated (UTC) time of the mobile terminal; and the mobile terminal determining the local time where the mobile terminal is located according to the local UTC time and the time zone information about the mobile terminal;

wherein the mobile terminal parsing the time data and obtaining the local UTC time of the mobile terminal comprises: the mobile terminal parsing the time data and obtaining a Handover Word (HOW) of each subframe; the mobile terminal reading Time Of Week (TOW) in the HOW, wherein the TOW records the UTC microsecond number of sending time of the subframe; and the mobile terminal calculating a UTC timestamp of the sending time of each subframe by combining the UTC microsecond number and the week number contained in a first subframe which is in a frame where the subframe is located.

2. The method according to claim 1, wherein the mobile terminal performing the time calibration on itself comprises: the mobile terminal employing an active mode or a passive mode to perform the time calibration on itself, wherein the active mode refers to time calibration activated by a user of the mobile terminal, and the passive mode refers to time calibration activated by a GPS satellite after positioning of the GPS satellite succeeds and it is detected that the time of the user has an error.

3. The method according to claim 2, wherein the mobile terminal reading the TOW in the HOW when the mobile terminal employs the active mode to perform the time calibration comprises:

if a navigation message of at least one GPS satellite is parsed out, then reading a TOW with the shortest transmission time in the HOW.

4. The method according to claim 1, wherein the time zone information is stored in a world time module of the mobile terminal.

5. The method according to claim 1, wherein the time zone information is stored in a world time module of the mobile terminal.

6. The method according to claim 2, wherein the time zone information is stored in a world time module of the mobile terminal.

7. The method according to claim 3, wherein the time zone information is stored in a world time module of the mobile terminal.

8. A time calibration device provided in a mobile terminal, comprising:

a determination module configured to determine local time where the mobile terminal is located according to time data in a received Global Positioning System) GPS navigation message and time zone information about the mobile terminal, wherein the determination module further comprises: a parsing unit configured to parse the time data and obtain local Universal Time Coordinated (UTC) time of the mobile terminal, wherein the parsing unit comprises: a parsing subunit configured to parse the time data and obtain a Handover Word (HOW) of each subframe; a reading subunit configured to read a Time Of Week (TOW) in the HOW, wherein the TOW records the UTC microsecond number of sending time of the subframe; and a calculation subunit configured to calculate a UTC timestamp of the sending time of each subframe by combining the UTC microsecond number and the week number contained in a first subframe which is in a frame where the subframe is located; and a determination unit configured to determine the local time where the mobile terminal is located according to the local UTC time and the time zone information about the mobile terminal; and a calibration module configured to perform time calibration on the mobile terminal according to the local time where the mobile terminal is located.

9. The device according to claim 8, wherein the reading subunit is further configured to read a TOW with the shortest transmission time in the HOW when the parsing subunit parses out a navigation message of at least one GPS satellite.

* * * * *